Jan. 19, 1943.　　　　F. A. HASSMAN　　　　2,308,688
MILLING MACHINE CONTROL MECHANISM
Filed March 6, 1940　　　5 Sheets-Sheet 1

INVENTOR.
FRED A. HASSMAN
BY
A. H. Parsons
ATTORNEY.

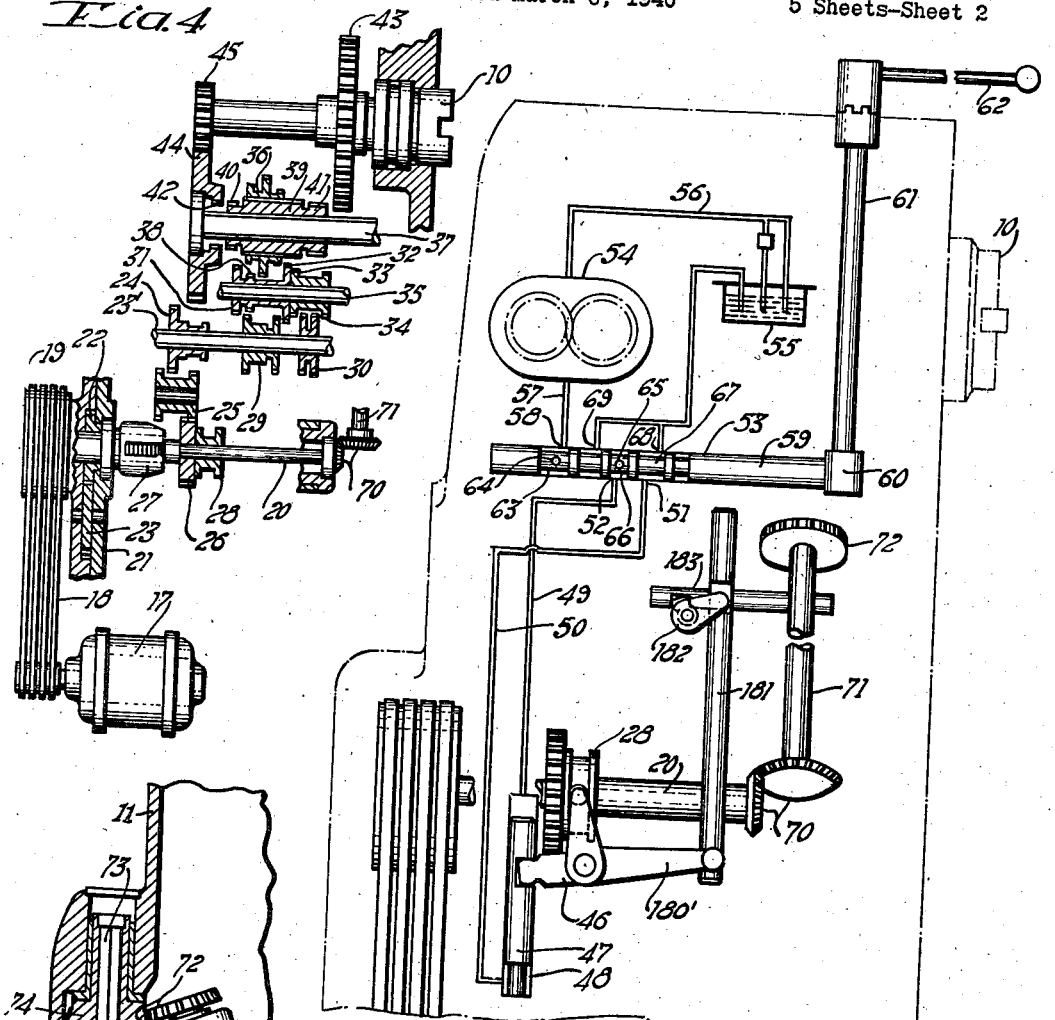

Jan. 19, 1943.     F. A. HASSMAN     2,308,688
MILLING MACHINE CONTROL MECHANISM
Filed March 6, 1940     5 Sheets-Sheet 3
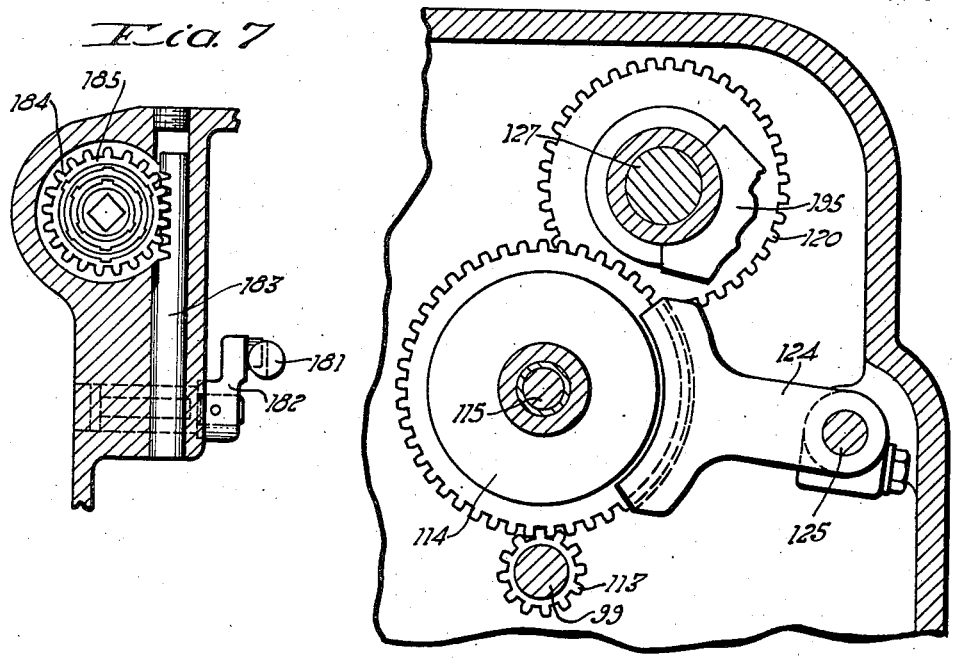
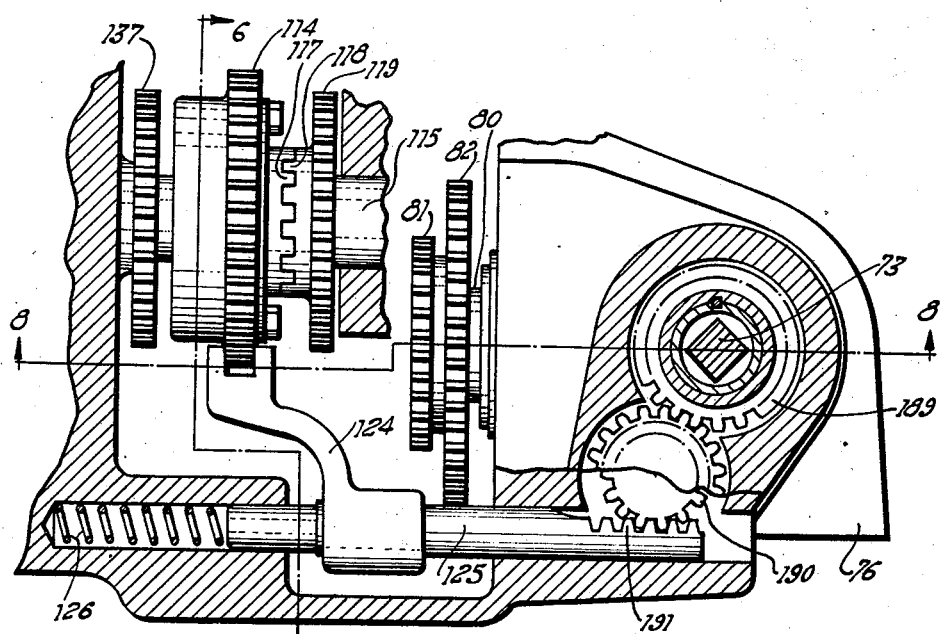
INVENTOR.
FRED A. HASSMAN
BY
A. H. Parsons
ATTORNEY.

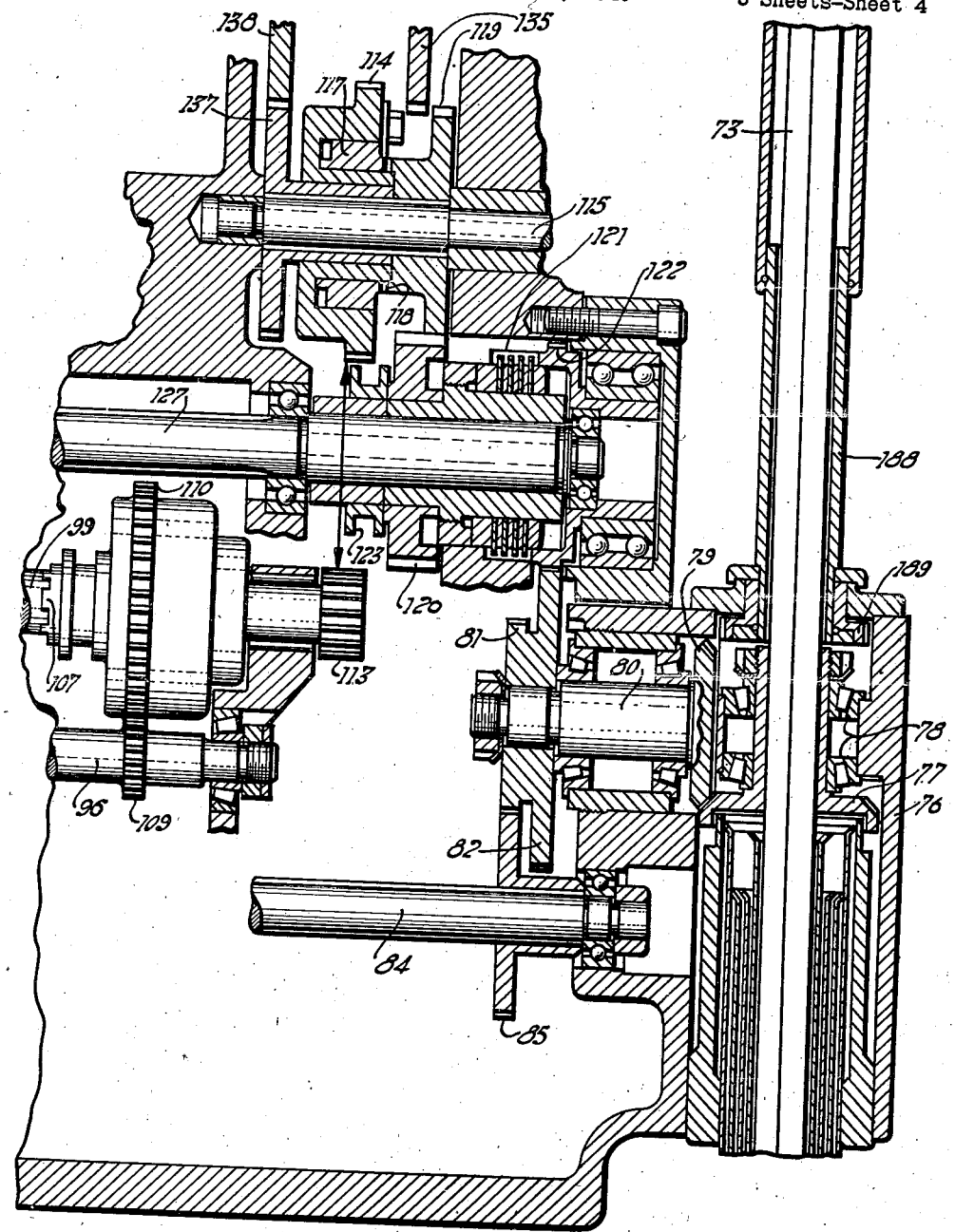

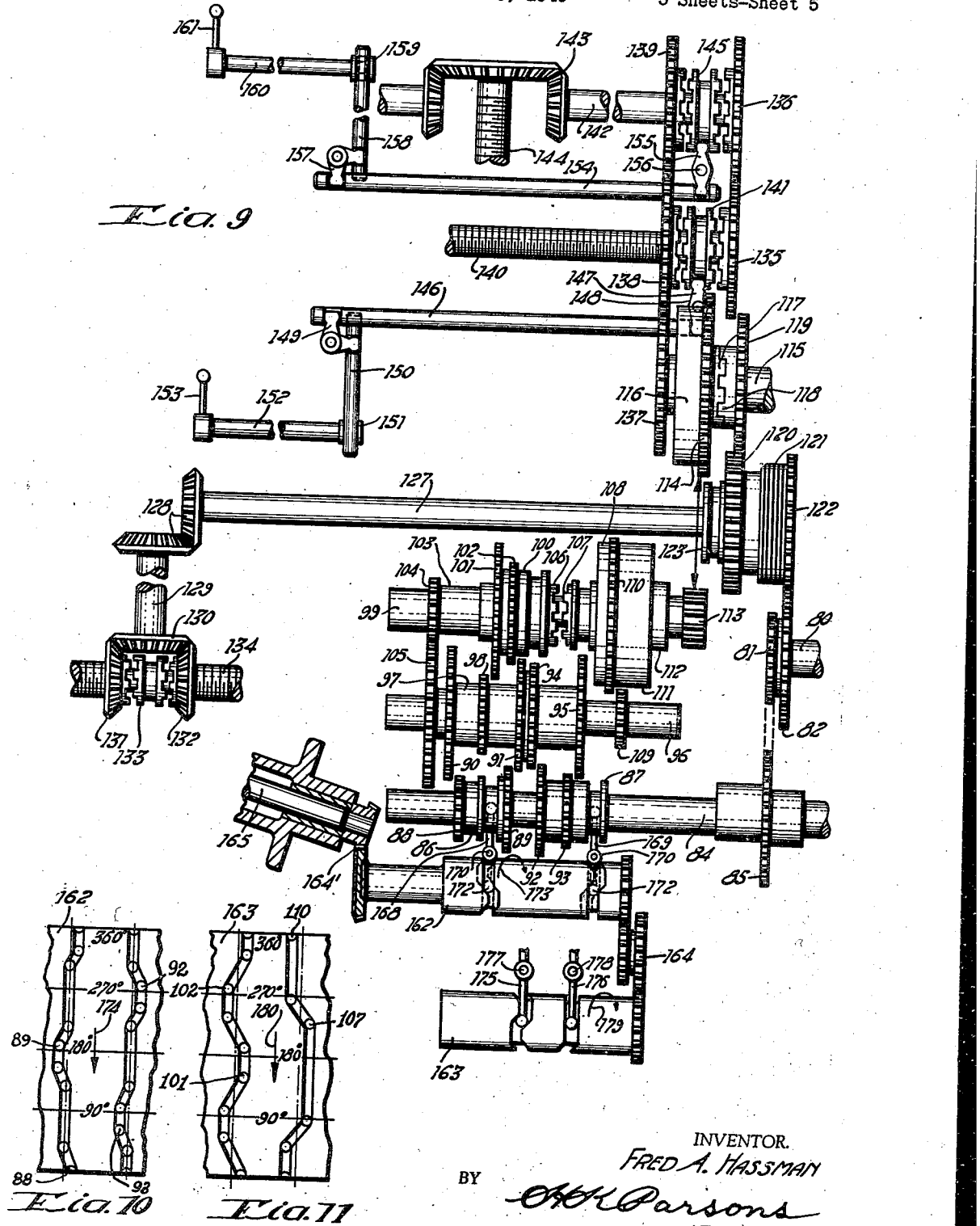

Patented Jan. 19, 1943

2,308,688

UNITED STATES PATENT OFFICE 2,308,688

MILLING MACHINE CONTROL MECHANISM

Fred A. Hassman, Cincinnati, Ohio, assignor to The Cincinnati Milling Machine Co., Cincinnati, Ohio, a corporation of Ohio Application March 6, 1940, Serial No. 322,468

14 Claims. (Cl. 90—21)

This invention relates to machine tools and more particularly to improvements in milling machines.

One of the objects of this invention is to provide an improved simplified and rugged milling machine which is convenient and safe to operate.

Another object of this invention is to provide a milling machine in which the control mechanism for determining the rate and direction of relative movement between the cutter and work is mounted on the knee in a convenient accessible position for the operator.

A further object of this invention is to provide a milling machine having a feed control clutch in the knee and a remote control therefor mounted in the column.

An additional object of this invention is to provide improved means in a milling machine for simultaneously controlling a work feed control clutch in the knee and a spindle control clutch in the column whereby the work feed is rendered ineffective when the spindle is stopped.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 2 is a diagrammatic view of the mechanism for controlling the spindle clutch and the feed clutch.

Figure 3 is a section on the line 3—3 of Figure 1.

Figure 4 is a diagrammatic view of the variable speed transmission for the spindle.

Figure 5 is an enlarged section on the line 5—5 of Figure 1.

Figure 6 is a view on the line 6—6 of Figure 5.

Figure 7 is a section on the line 7—7 of Figure 3.

Figure 8 is a section on the line 8—8 of Figure 5.

Figure 9 is an expanded view of the variable feed transmission in the knee and the branch transmissions to the various supports.

Figures 10 and 11 are expanded views of the feed rate control cams.

Figures 1, 12, 13:
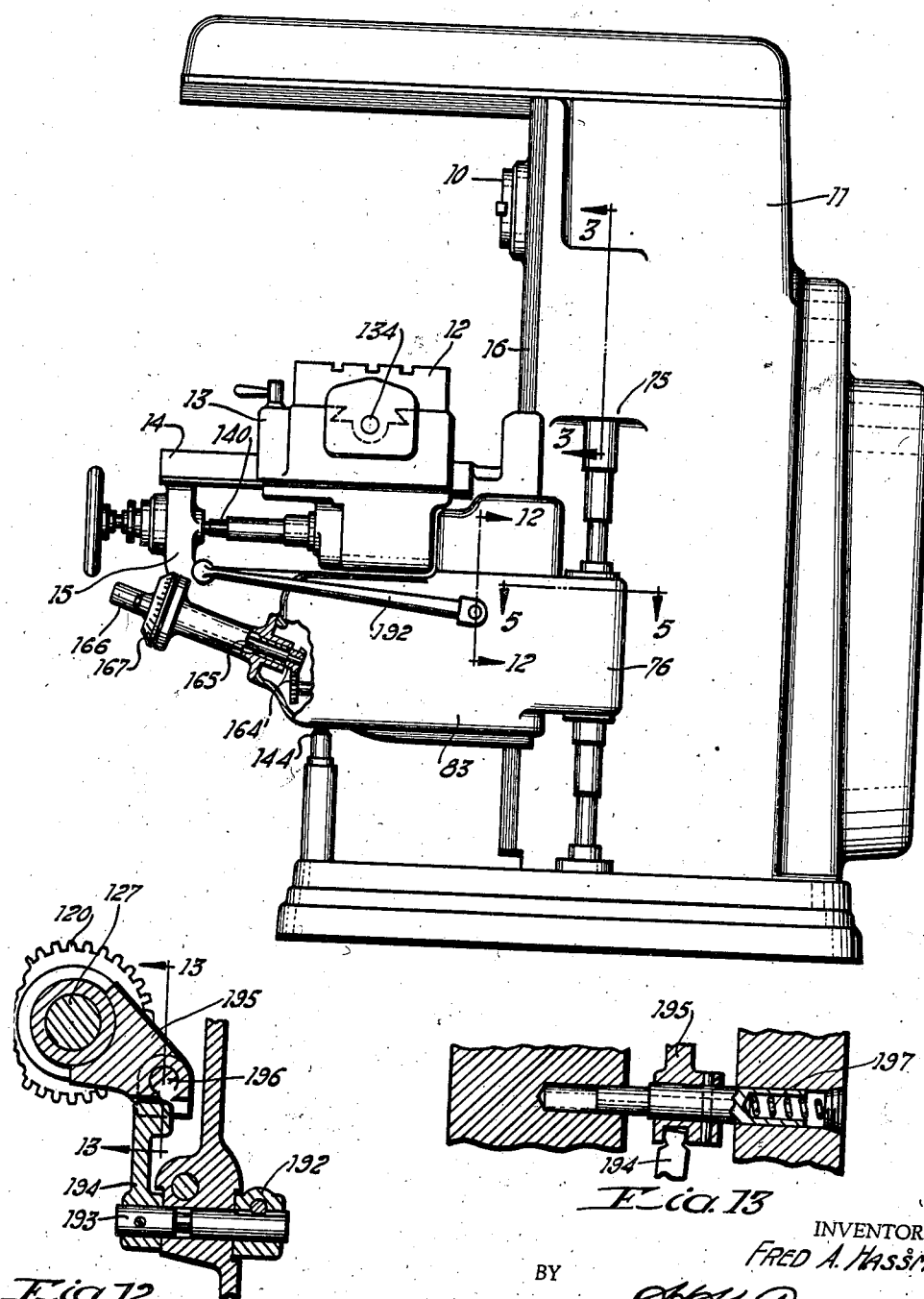
Figure 1 is a side elevation of a milling machine embodying the principles of this invention.
Figure 12 is a section on the line 12—12 of Figure 1.
Figure 13 is a detail section on the line 13—13 of Figure 12.

This invention is applicable to milling machines and more particularly to a milling machine of the knee and column type, such as that disclosed in Figure 1, wherein a cutter spindle 10 is journaled in a column or fixed support 11, and the work is mounted on a work support 12 which is capable of movemet in three different directions relative to the spindle. The three directions of movement are obtained by guiding the table 12 for movement in a direction transverse to the axis of the cutter spindle on a saddle 13; guiding the saddle 13 on ways 14 of a knee 15 for movement parallel to the cutter spindle; and guiding the knee 15 for vertical movement on the guideways 16 of the column.

Each of the work supporting elements, that is, the table, saddle and knee may be moved at a variable feed rate or at a rapid traverse rate. The means for determining these rates include a variable shiftable gear feed mechanism, a feed-rapid traverse selector, and a feed disconnector, all of which are mounted in the knee, while the actuating power is derived from a prime mover located in the column.

This same prime mover is also utilized for driving the cutter spindle through a spindle control clutch. By means of this invention the control for the spindle clutch in the column and the control for the feed disconnect clutch in the knee are interlockingly connected whereby it is impossible to effect a power feeding movement of any of the work supporting elements while the cutter spindle is at rest. On the other hand, however, and while the spindle is at rest the feed box and the rapid traverse train in the knee are continuously driven by the prime mover, thus making it possible to connect any of the work supporting elements to the rapid traverse train for quick set-up movements, and to effect gear shifting in the feed box easily because the gears are running whereby desired feed rate changes may be completed while the spindle is stopped.

A single shaft is utilized for transmitting power from the fixed support or column to the movable support or knee. This shaft is provided with protective means in the form of telescoping tubes and these tubes are additionally utilized for transmitting a control motion from the fixed support to the movable support.

The prime mover 17 which is located in the column is indicated in Figure 4 of the drawings and as there shown is connected by multiple belts 18 for continuous actuation of a pulley 19 which is permanently attached to the end of a horizontal drive shaft 20. In the bracket 21 which supports one end of the shaft 20 are mounted a pair of gears 22 and 23 which serve as a gear pump, the gear 22 being fixed to the shaft 20. The cutter spindle 10 is driven from the shaft 20 through a suitable form of variable speed transmission and for the purposes of illustration, one such form of transmission is illustrated in Figure 4 of the drawings. This transmission has a primary drive shaft 23' upon which is mounted a shiftable reversing gear 24 for changing the direction of rotation of the shaft. An idler gear 25 is interposed between the gear 24 and gear 26 which is connected to one-half of a friction disc clutch 27.

This clutch is controlled by a shiftable spool 28 whereby when the spool is shifted in one position the gear 26 is rotated and when shifted to the other position the gear 26 is at rest.

The gear 24 may be shifted to the left as viewed in Figure 4 to intermesh with the idler gear 25 to effect one direction of rotation of the shaft 23', and to the right into direct engagement with the gear 26 to effect the other direction of rotation of the shaft 23'.

The primary shaft 23' carries a pair of shiftable gear couplets 29 and 30 which are adapted to be selectively engaged with gears 31, 32, 33 and 34 fixed on the shaft 35. A shiftable gear couplet 36 supported on the shaft 37 is adapted to be intermeshed with either gear 32 or gear 38 on the shaft 35 for rotation of the sleeve 39 to which the couplet 36 is splined. The sleeve 39 has a pair of integral gears 40 and 41 formed on opposite ends thereof for selective engagement with gears 42 and 43, the gear 43 being directly fixed to the spindle 10. The gear 42 is integral with a gear 44 which is supported for free rotation on the shaft 37 and when the gear 44 is operatively connected to the gear 40 it drives the spindle 10 through the pinion 45.

By proper selective positioning of the various shiftable gears the spindle 10 may be actuated at a series of speeds, and may be connected and disconnected to the prime mover through the spindle control clutch 27.

The means for shifting the cutter spindle control clutch is shown in Figure 2, and comprises a bell crank 46 which operatively connects the shifter 28 to a fluid operable piston 47 slidably mounted in a cylinder 48. Opposite ends of the cylinder are connected by channels 49 and 50 to ports 51 and 52 of a control valve indicated generally by the reference numeral 53. This valve is supplied with fluid pressure from the gear pump 54 which is adapted to draw fluid from a reservoir 55 located at a suitable point in the machine through channel 56 for delivery through channel 57 to port 58 of valve 53. This valve has a plunger 59 which is operatively connected by a crank 60 to the lower end of a rotatable control shaft 61.

The upper end of this shaft carries a manually operable lever 62 which extends forwardly for convenient access by the operator. The plunger 59 has an annular groove 63 which is in constant communication with the pressure port 58. A cross bore 64 located in groove 63 is internally connected with a cross bore 65 in groove 66. Thus, in the position shown, pressure fluid from the pump 54 is connected to the upper end of cylinder 48 and the spool 28 is shifted to a clutch connecting position. The channel 50 from the other end of cylinder 48 is connected to reservoir by means of annular groove 67 which connects port 51 to the reservoir port 68.

By shifting the valve plunger 59 to the right the annular groove 65 is connected to port 51, and port 52 is connected to a second reservoir port 69. Thus, by rotating the control lever 62 the spindle clutch may be hydraulically shifted into either one of its two positions for starting or stopping the spindle.

As previously mentioned, the power for driving the table, saddle and knee is derived from the prime mover in the column, and a constantly driven train by which this power is transmitted to the knee is shown in Figures 2, 3 and 8.

Referring to Figure 2, the shaft 20, which is directly connected to the prime mover, is operatively connected by beveled gearing 70 to a shaft 71 which is supported in an inclined position as shown in Figure 3. The upper end of this shaft is connected by a bevel gear 72 for rotation of square shaft 73. The bevel gear 74 which drives the shaft 73 is journaled in a boss 75 that projects from the side of the column 11.

This boss overhangs in vertical alignment a boss 76 which projects from the rear of the knee 15 as shown in Figure 1 of the drawings. The shaft 73 is fixed against axial movement in the bevel gear 74, but has a sliding connection with bevel gear 77 which is anti-frictionally supported by bearings 78 in the boss 76, these bearings being thrust bearings which hold the gear 77 for movement with the knee. The gear 77 intermeshes with a bevel gear 79 secured to the end of shaft 80 for driving a pair of spur gears 81 and 82 keyed to the end of the shaft. The gear 81 serves to drive the variable feed transmission while the gear 82 forms part of the rapid traverse train for actuating the work supports at a fast rate.

The feed rate is determined by the position of the several shiftable gears located in the feed box 83 on one side of the knee 10. The variable feed gearing is shown expanded in Figure 9, and comprises a primary shaft 84 which has a drive gear 85 intermeshing with the gear 81. A pair of gear couplets 86 and 87 are splined on the shaft 84 for shifting movement. The couplet 86 includes gears 88 and 89 which are selectively shiftable into engagement with gears 90 and 91. The couplet 87 includes gears 92 and 93 which are selectively shiftable into engagement with gears 94 and 95. The gears 90, 91, 94 and 95 are supported for free rotation relative to their supporting shaft 96. These gears are integral with a sleeve 97 which has another gear 98 integral therewith. A third parallel shaft 99 supports a shiftable gear couplet 100 comprising gears 101 and 102 which are selectively shiftable into engagement with gears 98 and 91.

The couplet 100 is splined on a sleeve 103 which has a gear 104 integral therewith and intermeshing with a gear 105 integral with the shaft 96. The power thus flows from the sleeve 97 through either the gear pair 98—101 or 91—102 to the sleeve 103. This sleeve has clutch teeth 106 formed on the end thereof for selective engagement by clutch teeth 107 which are part of a shiftable clutch gear 108. When the clutch teeth are disengaged the power flows from the sleeve 103 through interconnected gearing 104—105, shaft 96 to gear 109 integral with the shaft 96 and adapted to be engaged by the gear 110.

The clutch gear 108 is connected to the shaft 99 through a series of friction plates enclosed in the drum 111 to the hub 112 which is fixed to the shaft 99. By means of this arrangement and by varying the clamping pressure on the friction discs, a safety clutch is provided which will prevent overloading of the feed transmission.

The shaft 99 terminates in a pinion 113 which is in continuous engagement with a gear 114 connected to its supporting shaft 115 by a ratchet clutch 116. The ratchet clutch also has clutch teeth 117 which are adapted to interengage with clutch teeth 118 formed integral with the hub of gear 119 which is keyed to the shaft 115.

The variable feed transmission terminates in the gear 114 and this gear is shiftable on the shaft 115 to effect disengagement of the clutch teeth 117 from the clutch teeth 118. The clutch teeth 117 therefore constitute the feed disconnect clutch. Gear 119 is adapted to be driven by the gear 114 at a feed rate, or alternatively by a gear 120 at a rapid traverse rate and since the latter rate is the faster it will overdrive the feed transmission by virtue of the ratchet clutch. The rapid traverse gear 120 is connected by a rapid traverse clutch 121 and spur gear 122 to the rapid traverse drive gear 82.

The rapid traverse clutch 121 is actuated by a shifter spool 123. The clutch 117 is connected for joint shifting with the gear 114 and this latter gear is shifted by a fork 124 shown in Figure 6 which engages opposite sides of the periphery of the gear, the fork being supported on a shifter rod 125. As shown in Figure 5, the shifter rod 125 is normally held in position by spring 126 to maintain engagement of the clutch teeth 117 with the clutch teeth 118.

The gear 120 is thus normally driven at a feed rate but may be selectively driven at will at a rapid traverse rate by engagement of the rapid traverse clutch 121. The gear 120 is fixed to a table drive shaft 127 which is connected through bevel gearing 128 and shaft 129 for rotation of bevel gear 130. This gear rotates the bevel gears 131 and 132 in opposite directions whereby the direction control clutch 133 splined on the table lead screw 134 may selectively connect either one of the bevel gears for opposite directions of table movement. The shaft 127 and parts driven thereby constitute a branch transmission for actuation of the table.

The gear 120 also serves to drive the saddle and knee in one of their two directions of movement, the gear 120 meshing with gear 135 which, in turn, drives gear 136. The other direction of movement of the saddle and knee is effected by a gear 137 fixed to the shaft 115 and intermeshing with a gear 138 which, in turn, drives gear 139. The gears 135 and 138 are supported for free rotation on the end of the saddle lead screw 140 and are selectively connected thereto by a shiftable clutch 141 which is interposed between the two gears.

Gears 136 and 139 are supported for free rotation on a shaft 142 which is connected by bevel gearing 143 to the knee elevating screw 144. A shiftable clutch 145 splined on the shaft 142 is selectively shiftable into engagement with clutch teeth on opposing faces of gears 136 and 139.

The reversing clutch 141 for the saddle is operated by a shifter rod 146 which is slidably supported in the knee and operatively connected to the shifter spool by a shifter fork 147 supported on an intermediate pivot 148. The shifter rod 146 is connected by a bell crank 149 to rod 150 which, in turn, is connected by a crank 151 to a rotatable rod 152. A manually operable control lever 153 mounted on the front of the machine and attached to the end of the rod 152 serves as a manual control member for the clutch 141.

The reversing clutch 145 for the knee is actuated by a shifter rod 154 which is operatively connected to the clutch spool by a shifter fork 155 which is pivoted at an intermediate point 156. The shifter rod is connected by a bell crank 157 to cross rod 158. This, in turn, is connected by a crank 159 to a rotatable rod 160 that has a manual lever 161 attached to the end thereof. The lever 161 thus serves as a manual control for the knee reversing clutch 145.

It will thus be evident that there are three branch transmissions controlled by the feed clutch and the rapid traverse clutch for operating the three different work supporting elements and each element may be individually controlled as to direction.

The positions of the shiftable gears of the variable feed transmission are determined by a pair of barrel cams 162 and 163 shown rolled out in Figures 10 and 11 which are interconnected by suitable gearing 164 whereby the cam 162 makes one complete revolution for a one-quarter revolution of the cam 163. The cam 162 is connected by bevel gearing 164' to a manually rotatable shaft 165.

The shaft 165 is rotated by a crank 166, Figure 1, secured to the end thereof, and the bevel gearing 164' is in a one to two ratio whereby one-half revolution of the crank will effect one-quarter revolution of cam 162. A suitably graduated dial 167 is supported on the shaft 165 and connected thereto by reduction gearing inclosed under the dial and having a ratio of 1–8 whereby one-half of a revolution of the crank will effect $\tfrac{1}{16}$ of a revolution of the dial 167.

Since the cam 162 makes a full revolution for each quarter revolution of the control cam 163, the former is provided with cam tracks as shown in Figure 10 whereby the primary gears are successively engaged in the following order: 88, 93, 89 and 92, these numerals being affixed to the shifter roller on Figure 10 to show the gear that is in mesh for the different positions of the roller rather than the numeral for the roller itself. The same is true of Figure 11.

The cam 163 is provided with cam tracks as shown in Figure 11 whereby, during the first revolution of cam 162, gears 101 and 110 are engaged; during the second revolution gears 102 and 110 are engaged; during the third revolution gear 101 and clutch 107 are engaged; and during the fourth revolution gear 102 and clutch 107 are engaged.

Thus, any one of sixteen speeds may be selected at will by the operator, it being remembered that the primary shaft is always rotating which facilitates intermeshing of the various shiftable gears and insures that each shifting movement may be immediately completed.

The shifters 168 and 169 for gear couplets 86 and 87 are pivotally supported on fixed pivots 170 and 171 and rollers 172 on the end thereof engage cam tracks on drum 162 on the underside thereof as viewed in Figure 9. The arrow 173 in Figure 9 indicates the direction of rotation of the drum and the arrow 174 in Figure 10 indicates the direction of relative movement of the cam paths with respect to the rollers. The shifters 175 and 176 which control the shifting of couplet 100 and the clutch gear 108 are supported on fixed pivots 177 and 178 and engage the cam tracks on the top side of the cam drum 163 as viewed in Figure 9. The drum 163 rotates in the direction of arrow 179 and the arrow 180 in Figure 11 indicates the direction of relative movement between the cam tracks and the rollers.

The feed transmission is capable of developing relatively high power and low feed rates while the rapid traverse transmission develops relatively low power but high rates of movement. It is deemed preferable that only the low power movements be made available for set-up adjustments and for any other movements while the spindle is stopped because if collisions occur between the moving support and the stationary cutter spindle the damage will possibly not be as great because there is a better chance of stalling the moving support due to the low power of the transmission effecting the movement. Therefore, when the spindle is stopped, provision is made for automatically rendering the feed transmission unavailable for effecting movements of any of the work supporting elements.

The interlock between the cutter spindle and the feed transmission is obtained by providing a motion transmitting connection between the actuator for the spindle control clutch and the final gear 114 of the feed transmission whereby when the spindle clutch is disconnected, the gear 114 is automatically shifted to disengage the feed disconnect clutch. In other words, the bell crank 46 shown in Figure 2 and serving as the actuator for the spindle control clutch is operatively connected to the shifter rod 125 of gear 114 shown in Figure 5. To this end the bell crank 46 is provided with a third lever arm 180' which is pivotally connected for axial movement of rod 181. This rod is connected by a bell crank 182 to a rack bar 183. As shown in Figures 3 and 7 the rack bar serves to rotate a gear 184 which is integral with the periphery of a tube 185 which is supported for rotation in the boss 75. The tube 185 is held against axial movement and is the outer one of a series of telescoping tubes such as 186 and 187 which surround the shaft 73 for protective purposes. The tubes have interlocking longitudinally extending splines whereby rotary movement may be transmitted through the several tubes without interfering with their telescoping action. The final tube 188 shown in Figure 8 has a spur gear 189 secured to the end thereof within the boss 76. Referring to Figure 5, the gear 189 is operatively connected through idler gears 190 to rack teeth 191 formed on the periphery on the shifter rod 125. Thus, when the piston 47 is hydraulically actuated to disengage the spindle clutch, a control motion is transmitted from the fixed support or column to the movable support or knee through the telescoping tubes to the shifter rod 125 which effects disengagement of the clutch teeth 117 from the clutch teeth 118.

In this position of the parts the rapid traverse clutch 121 may still be engaged at will by operation of the manual control lever 192. As shown in Figure 12 this lever is attached to the end of a rotatable shaft 193 which carries a crank 194. The end of the crank engages a slot in the shifter fork 195 which is attached to a supporting rod 196. This rod is slidably mounted in the knee casting and is continuously urged in one direction by a spring 197 normally maintaining the clutch disengaged.

There has thus been provided an improved transmission and control mechanism for a milling machine in which the variable feed box is mounted in the knee for continuous actuation by a prime mover in the column, together with interlocking controls which effect disconnection of the feed box from the branch transmissions to the various supports whereby it is impossible to effect power movement of the table, saddle or knee at a feed rate whenever the spindle is stopped. A rapid traverse train is provided in the knee for continuous actuation by the prime mover in the column for selective power operation of the various supports while the spindle is stopped and this train, as well as the feed box, receive their power through a common shaft which is protected by a telescoping tube and means are provided for utilizing this tube for transmitting a control motion from the column to one of the movable supports.

What is claimed is:

1. In a machine tool having a fixed support and a movable support carried thereby, the combination of power operable means mounted in the fixed support, a drive shaft extending from said power operable means to the movable support for effecting relative movement between the supports, a telescoping tube surrounding and enclosing said shaft, a shiftable control member in the movable support and operative for varying the effect of said shaft, a control member mounted on the fixed support, and means including said telescoping tube for operatively connecting said control member to said shiftable member.

2. In a machine tool having a fixed support in which a tool is mounted and a movable support for carrying a work piece, the combination of a prime mover mounted in the fixed support, a power transmission drive shaft extending from the fixed support to the movable support and actuated by said prime mover, a shiftable control member mounted in the movable support for controlling the effect of said shaft, a manually operable control mounted on the fixed support, tubular means surrounding the exposed portion of said drive shaft between the fixed support and the movable support, and motion transmitting means including said tubular means for transmitting motion from said manually operable control to said shiftable control member.

3. In a machine tool having a first support and a second support, one of which is mounted on the other for relative movement, the combination of a transmission mechanism mounted in one of said supports for effecting relatively movement between the supports including a shiftable control clutch, a manually operable control mounted on the other support, and motion transmitting means extending from the manual control on one support to the shiftable clutch on the other support, said means including rotatable telescoping splined tubes extending from one of said supports to the other.

4. In a milling machine having a tool spindle support and a work support, the combination of a continuously driven power shaft in the spindle support, means including a clutch for operatively connecting said shaft for actuation of the spindle, a power train driven by said shaft and extending to the work support, a clutch mounted in the work support for connecting said train to effect feeding movement of the work support, a manually operable control mounted on the spindle support, and means operatively connecting said control for effecting simultaneous shifting of the clutches in the respective supports.

5. In a milling machine having a column, a tool spindle mounted in the column and a knee supported on the column for effecting relative movement between work adapted to be carried thereby and the tool spindle, the combination of a shaft journaled in the column, a prime mover connected for continuous operation of said shaft, means for driving said spindle from said shaft including a clutch, a power train continuously driven by said shaft and extending to the knee, a clutch mounted in the knee for connecting said train to effect feeding movement of the knee, a manually operable control mounted on the column, a valve actuable by said control and hydraulically operated means controlled by said valve for simultaneously shifting said clutches.

6. In a milling machine having a column, a tool spindle mounted in the column, a prime mover and means for operatively connecting the spindle to said prime mover, the combination of a shaft continuously driven by said prime mover, branch trains actuated by said shaft and terminating respectively in an overrunning clutch and a friction clutch, a work support mounted on the column, a final shaft for driving said work support, means normally maintaining the overrunning clutch in driving relation to said shaft, means for selectively engaging the friction clutch to effect rapid traverse movement of said shaft, and means for automatically disconnecting the overrunning clutch when the spindle is disconnected from the prime mover.

7. In a milling machine having a column, a tool spindle journaled in said column, a prime mover and power transmission means for actuating said spindle from said prime mover including a disconnecting clutch, the combination with a knee movably mounted on said column and carrying means for shifting work relative to the tool spindle, of a constantly driven power train coupled to said prime mover and terminating in said knee, a shiftable gear rate change mechanism mounted in the knee and driven by said train, a rapid traverse train connected in parallel with the rate change mechanism to said power train, a final drive shaft, means normally connecting said mechanism to the drive shaft including a shiftable clutch, means for selectively connecting said rapid traverse train to said drive shaft, a manually operable control member mounted in the column for controlling the spindle clutch, and means simultaneously operable by said control when shifted in a direction to effect disengagement of the spindle clutch to simultaneously effect disengagement of the feed clutch.

8. In a milling machine having a column, a cutter spindle journaled in the column, a prime mover and a clutch for connecting the prime mover for operation of the spindle, the combination with a knee mounted on the column for relative movement with respect thereto, a work supporting table carried by the knee, means for actuating said table including a variable feed transmission and a rapid traverse train mounted in the knee, means operatively connecting the prime mover for continuous operation of said mechanism and rapid traverse train, a table drive shaft, a clutch for connecting said shaft for actuation of the table, means for controlling said spindle clutch and operable to disconnect the spindle from said prime mover, and means positionable by said clutch control means when actuated to disconnect the spindle clutch for rendering it impossible for the table control clutch to connect the table to the feed rate mechanism but permitting connection to the rapid traverse train.

9. In a machine tool having a fixed support and a movable support carried thereby, the combination with power operable means mounted in the fixed support, of a drive shaft extending from said power operable means to the movable support for effecting actuation thereof, a telescoping tube surrounding and enclosing said shaft, a shiftable control member in the movable support for varying the effect of said shaft, a fluid operable member mounted in the fixed support, means for controlling the admission of fluid pressure to said fluid operable member, and motion transmitting means including said telescoping tube for operatively connecting said fluid operable member for actuation of said shiftable control member.

10. In a milling machine having a column, a tool spindle mounted in the column, a prime mover, and means for operatively connecting the spindle to said prime mover for actuation thereby, the combination of a shaft continuously driven by said prime mover, branch trains actuated by said shaft at respectively different rates and terminating respectively in an overrunning clutch and a friction clutch, a work support mounted on the column, a final shaft for driving said work support, means normally maintaining the overrunning clutch coupled to said final shaft, means for disconnecting the spindle from the prime mover and simultaneously effecting disconnection of the overrunning clutch from the final shaft, and means for engaging said friction clutch at will to effect actuation of said final shaft when the spindle is stopped.

11. In a milling machine having a column, a knee, saddle and table supported on said column, a tool spindle journaled in the column, and means for actuating said spindle including a prime mover, the combination of a shiftable gear variable feed transmission mounted in the knee, said feed transmission having an input shaft and an output shaft, a clutch for connecting said output shaft for potential actuation of the knee, saddle and table, manually operable control means including a feed rate change control lever mounted on the knee for shifting the gears of the variable feed transmission, means simultaneously operable for disconnecting the spindle from said prime mover and disconnecting said clutch, and means connecting the input shaft of said feed transmission to the prime mover for continuous actuation thereby, whereby the shiftable gears of the feed transmission will be rotating during feed rate changes while the spindle is stopped.

12. In a milling machine having a column, a tool spindle journaled in the column and work supporting means including a knee, saddle and table, the combination of transmission means for translating the work supporting members relative to the spindle including independent reverser mechanisms for the knee, saddle and table, a common drive shaft therefor, a feed clutch for connecting said reverser mechanisms simultaneously to said common drive shaft, means in the knee for actuating said shaft at variable feed rates, a prime mover mounted in the column, a spindle clutch interposed between the prime mover and the spindle, motion transmitting means coupling the prime mover for continuous actuation of the feed mechanism, and means for simultaneously effecting engagement of the spindle clutch and the feed clutch.

13. In a milling machine having a column, a tool spindle journaled in the column, and work supporting means mounted on the column, the combination of a prime mover mounted in the column, a shaft journaled in the column for continuous actuation by the prime mover, means for connecting the spindle to the shaft for actuation thereby, and means simultaneously operated by said connecting means to connect said shaft for actuation of the work supporting means.

14. In a machine tool having a fixed support and a movable support, the combination of a power driven shaft extending from one of said supports to the other for actuation of said movable support, a telescoping tube surrounding said shaft for protection thereof, means rotatably supporting opposite ends of said tube in the respective supports, control connections at one end of said tube for imparting rotation thereto, and means operatively connected to the other end of said tube for controlling the effect of said shaft on said movable support.

FRED A. HASSMAN.